United States Patent [19]
Suzuki

[11] Patent Number: 5,091,794
[45] Date of Patent: Feb. 25, 1992

[54] TWISTED NEMATIC LIQUID CRYSTAL DISPLAY DEVICE

[75] Inventor: Shunji Suzuki, Yokohama, Japan

[73] Assignee: International Business Machines Corporation, Armonk, N.Y.

[21] Appl. No.: 434,747

[22] Filed: Nov. 13, 1989

[30] Foreign Application Priority Data

Nov. 11, 1988 [JP]  Japan .................... 63-283760

[51] Int. Cl.$^5$ .................................... G02F 1/13
[52] U.S. Cl. ...................... 359/93; 359/94; 359/63; 359/77; 359/78
[58] Field of Search ............ 350/347 R, 347 E, 340, 350/341, 337, 347 V, 334

[56] References Cited

U.S. PATENT DOCUMENTS

| | | | |
|---|---|---|---|
| 4,443,065 | 4/1984 | Funada et al. | 350/347 E |
| 4,527,864 | 7/1985 | Dir | 350/337 |
| 4,664,482 | 5/1987 | Kando et al. | 350/347 E |
| 4,759,612 | 7/1988 | Nakatsuka et al. | 350/337 |
| 4,906,073 | 3/1990 | Hunahata et al. | 350/347 E |
| 4,909,605 | 3/1990 | Asano et al. | 350/346 |
| 4,930,877 | 6/1990 | Kano et al. | 350/347 E |

FOREIGN PATENT DOCUMENTS

| | | | |
|---|---|---|---|
| 0259822 | 3/1988 | European Pat. Off. | 350/346 |
| 0266184 | 5/1988 | European Pat. Off. | 350/347 E |
| 54-135551 | 10/1979 | Japan | 350/347 E |
| 61-210324 | 9/1986 | Japan | 350/334 |
| 61-256324 | 11/1986 | Japan | 350/337 |
| 62-180327 | 8/1987 | Japan . | |
| 62-240928 | 10/1987 | Japan . | |
| 62-279315 | 12/1987 | Japan | 350/337 |
| 1-216318 | 8/1989 | Japan | 350/347 V |

*Primary Examiner*—Rolf Hille
*Assistant Examiner*—Minhloan Tran
*Attorney, Agent, or Firm*—Bernard E. Shay; David Aker

[57] ABSTRACT

The present invention relates to a normally dark twisted nematic liquid crystal display device. The device having an optical path length difference ($\Delta nd$) which is equal to the product of the thickness (d) of the liquid crystal layer and the double refraction index ($\Delta n$) of the liquid crystal layer. The display device is characterized in that the optical path length difference ($\Delta nd$) of the liquid crystal layer has a value such that 1.4 $\mu m \leq \Delta nd \leq 1.7$ $\mu m$.

6 Claims, 11 Drawing Sheets

□ : Δnd = 1.09 μm
+ : Δnd = 1.22 μm
× : Δnd = 1.29 μm

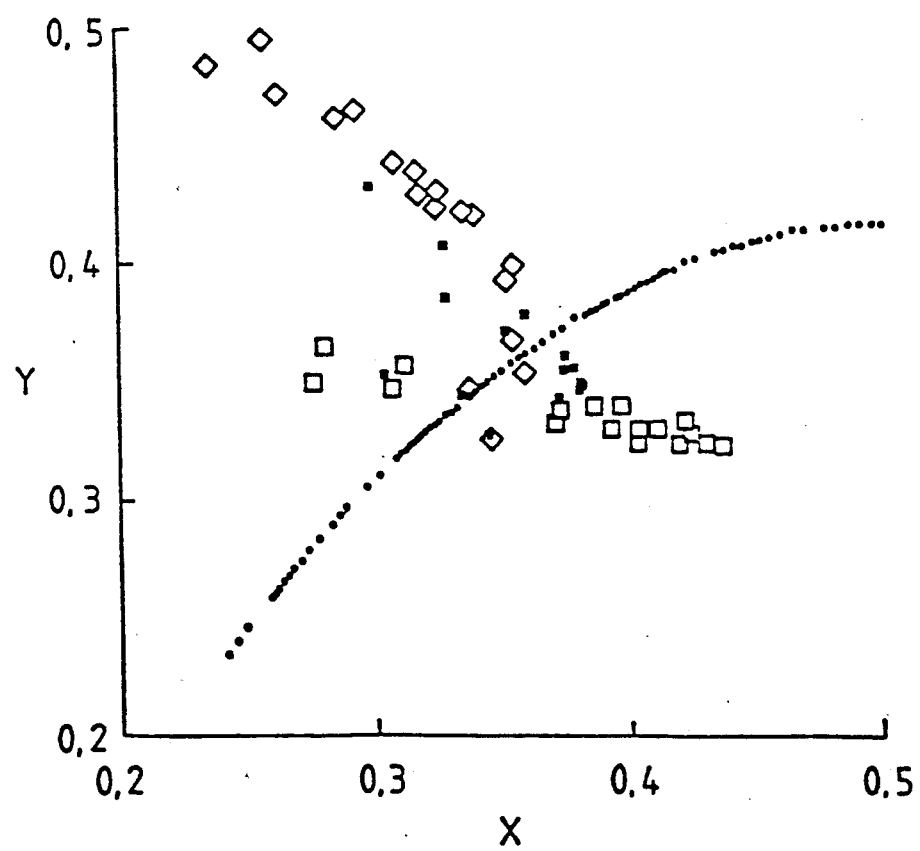

+ : Δnd = 1.72 μm
■ : Δnd = 1.78 μm
◇ : Δnd = 2.00 μm

TWISTED NEMATIC LIQUID CRYSTAL DISPLAY DEVICE

The present invention relates in general to a so-called "normally black" twisted nematic liquid crystal display devices wherein the liquid crystal molecules are twisted by 90° so that light is not able to pass through the display when no voltage is applied and, more particularly, to a "normally dark" display wherein the double refractive index of the liquid crystal layer is between 1.4 μm and 1.7 μm.

BACKGROUND OF THE INVENTION

In a "normally black" type twisted nematic liquid crystal display device, a 90° twist of the major axes of the molecules is achieved by placing a liquid crystal layer between a first transparent electrode subjected to orientation treatment in a first direction and a second transparent electrode subjected to orientation treatment in a second direction, perpendicular to the first direction. A first transparent polarizing plate having a direction of polarization coinciding with the first direction is provided outside the first electrode and a second transparent polarizing plate also having a direction of polarization coinciding with the first direction is provided outside the second electrode. When a voltage is not applied between the first and second electrodes, light is not able to pass through the liquid crystal layer due to the 90° twist of the major axes of the molecules of the liquid crystal layer. When an excitation voltage is applied between the first and second electrodes, the major axes of the molecules of the liquid crystal are all made parallel to an electric field created by the applied voltage. Thus, when a voltage is applied, incident light passes through the liquid crystal layer. In such a liquid crystal display device, the optical path length difference (Δnd) of the liquid crystal layer is set in such a manner that the transmission factor through the liquid crystal layer with no voltage applied to the electrodes is minimized. The optical path length difference may also be referred to as "retardation", that is, the product of the thickness (d) of the liquid crystal layer between the first and second electrodes (i.e. the thickness of the layer) and the double refraction index (Δn) of the liquid crystal layer. In a normally dark display, the display screen is observed from its front face and the second polarizing plate is viewed. The second polarizing plate is normally not transmitting any light.

Japanese Published Unexamined Patent Application No. 62-180327 discloses a liquid crystal display panel in which the difference in the optical path length of its liquid crystal layer is made to be in a range from 0.7 μm to 0.9 μm and the difference between the polarizing angle due to the polarizing plate and the rubbing angle is made to be in the range from 20° to 50°.

Japanese Published Unexamined Patent Application No. 62-240928 discloses a liquid crystal optical shutter in which the product of the thickness of its liquid crystal layer and the double refraction index of the liquid crystal layer is between 0.18 μm and 0.4 μm.

Until now, in a arrangement for setting the optical path difference (Δnd) of the liquid crystal layer which is used in the above-mentioned "normally black" type twisted nematic liquid crystal display device, the contrast ratio is a maximum when the display screen is observed from the front face. However, the black level (color of background) and the contrast ratio vary with the change in the visual angle. In these displays, the liquid crystal layer must be thin. Accordingly, if small errors exist in the thickness of the layer, the contrast and the chromaticity will vary.

The technology disclosed in Japanese Published Unexamined Patent Application No. 62-180327 (see above) is applicable only to the so-called simple matrix-type liquid crystal display devices. The technology relates to a TN type liquid crystal display device using a bias rubbing method in which the twist of the axes of the molecules of its liquid crystal layer is not necessarily 90°, and the technology is not applicable to a "normally black" type twisted nematic liquid crystal display device. In a "normally black" twisted nematic liquid crystal display device, if the optical path difference (Δnd) is between 0.7 μm to 0.9 μm, the leakage of light during interruption of the electric field is large, the absolute value of the contrast ratio is low, and the color of the background varies depending on the visual angle. Thus, a display of this type is not applicable to normally black displays.

The technology described in Japanese Published Unexamined Patent Application No. 62-240928 (see above) is used to enhance the optical response speed of a liquid crystal shutter, and it is not applicable to a liquid crystal display device having a large screen. In order for the optical path difference (Δnd) to be 0.18 μm and 0.4 μm, it is necessary for the thickness of the liquid crystal layer, that is, the thickness (d) of the cell to be between 1.8 μm to 4 μm if the double refraction index (Δn) of the liquid crystal layer is 0.1. It is technically difficult to realize this thickness ranging over a large area, for example, in a range where errors must be within ±0.2 μm.

The present invention is intended to provide a "normally black" type twisted nematic liquid crystal display device in which, when the visual angle is varied, the variation in its contrast and black level (color of background) is relatively small for very small variations in the thickness of the liquid crystal layer, and, moreover, a display in which a sufficient contrast ratio can be obtained.

SUMMARY OF THE INVENTION

The present invention relates to a twisted nematic liquid crystal display device comprising a first transparent electrode which has been subjected to orientation treatment in a first direction and second transparent electrode, which has been subjected to orientation treatment in a second direction. A liquid crystal layer, the major axes of the molecules of which are subjected to a twisted orientation (e.g. 90°), is located between said first and second electrodes. A first transparent polarizing plate having a direction of polarization coinciding with the first direction is located outside the first electrode. A second transparent polarizing plate having a direction of polarization coinciding with the first direction is located outside the second electrode. In such a device, when no voltage is applied between the two electrodes, light incident on the first polarizing plate is not able to pass through the liquid crystal layer due to the twisted orientation of the major axes of the molecules of the liquid crystal layer. However, when an excitation voltage is applied between the two electrodes, the major axes of the molecules of the liquid crystal layer are re-oriented so as to lie parallel to the electric field and light incident on the first polarizing plate is able to pass through the liquid crystal layer and out through the second polarizing plate.

According to the invention, the display device is characterized in that the optical path length difference ($\Delta$nd) of the liquid crystal layer, which is equal to the product of the thickness (d) of the liquid crystal layer and the double refraction index ($\Delta$n) of the liquid crystal layer, has a value such that $1.4~\mu m \leqq \Delta nd \leqq 1.7~\mu m$.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

FIG. 5B is a diagram of chromaticity showing the chromaticity of the black level with the visual angle $\theta$ set to 0°, 10°, 20°, 30°, and 40° right and left, and up and down when the optical path difference is 1.37 $\mu$m, 1.49 $\mu$m and 1.64 $\mu$m in a liquid crystal display device as illustrated in FIGS. 1 and 2.

DETAILED DESCRIPTION

Figure 1:
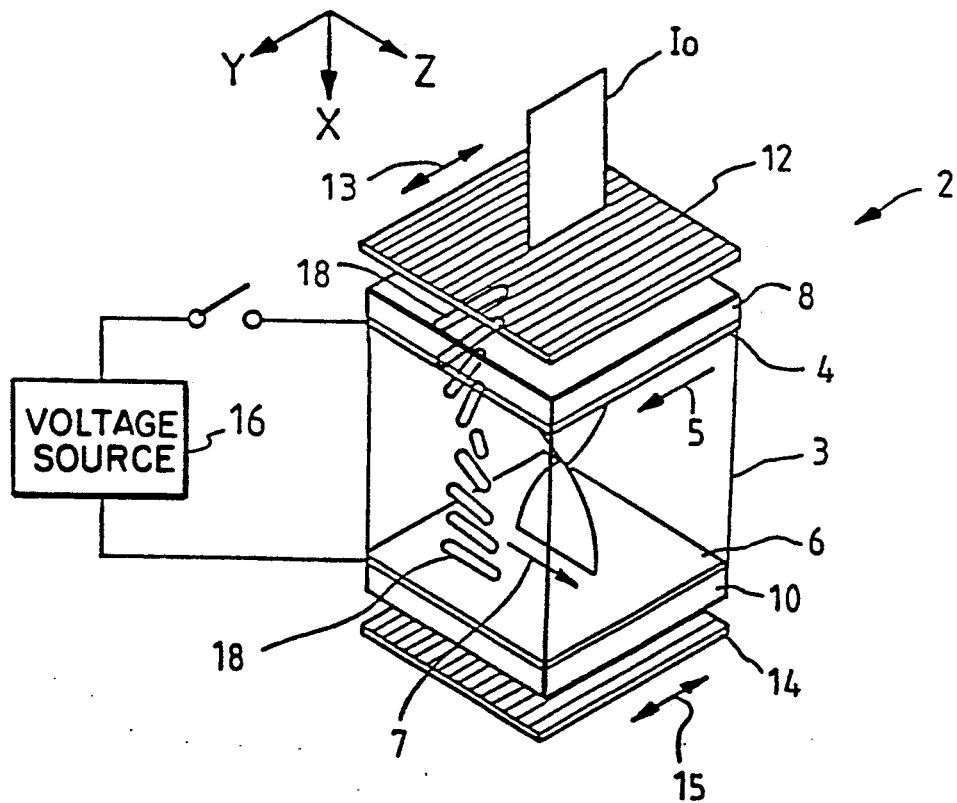
FIG. 1 is an exploded perspective view of a "normally black" type twisted nematic liquid crystal display device to which no excitation voltage has been applied.

A "normally black" type twisted nematic liquid crystal display device will be described with reference to FIG. 1 and FIG. 2. In FIG. 1, a twisted nematic liquid crystal display device 2 includes a liquid crystal layer 3 having a positive dielectric anisotropy, which extends between a pair of transparent glass substrates 8 and 10, inside of which, respectively, transparent electrodes 4 and 6 are provided. Linearly polarizing plates 12 and 14 are provided outside the glass substrates 8 and 10, respectively. On the surface of the electrode 4, in the direction shown by an arrow 5 (Y-axis direction), a molecule orientation treatment such as rubbing or the like, is performed. On the surface of the electrode 6, in the direction shown by an arrow 7 (the Z-axis direction, perpendicular to the Y-axis direction) a molecule orientation treatment, such as rubbing or the like, is performed. As a result of this orientation treatment, when no voltage is applied between the electrodes 4 and 6 from a voltage source 16, the major axes 18 of the molecules of the liquid crystal are oriented in the Y-axis direction on the interface contiguous with the electrode 4 and oriented in the Z-axis direction on the interface contiguous with the electrode 6. Accordingly, the axes of the molecules of the liquid crystal are oriented in a helical shape, uniformly twisted by 90° between the electrodes 4 and 6 as illustrated. The direction of polarization 13 and 15 of the linearly polarizing plates 12 and 14 are both in the same Y-axis direction as the orientation treatment for the surface of the electrode 4.

When a voltage is not applied between the electrodes 4 and 6 from the voltage source 16, the plane of polarization of an incident light beam $I_0$ matches the direction of polarization of the linearly polarizing plate 12. When the light beam $I_0$ passes through the liquid crystal layer 3 between the electrode 4 and the electrode 6, its plane of polarization is rotated, as illustrated, through an angle corresponding to the twisted orientation of the axes of the molecules of the liquid crystal. Therefore the light beam reaches the linearly polarizing plate 14 with its plane of polarization parallel to the direction 7, as shown in FIG. 1. Since the plane of polarization of the light beam $I_0$ is different from the plane of polarization of the linearly polarizing plate 14 by an angle of 90°, the light beam $I_0$ does not pass through the linearly polarizing plate 14, and a "dark state" is displayed for an observer located below the linearly polarizing plate 14.

Figure 2:
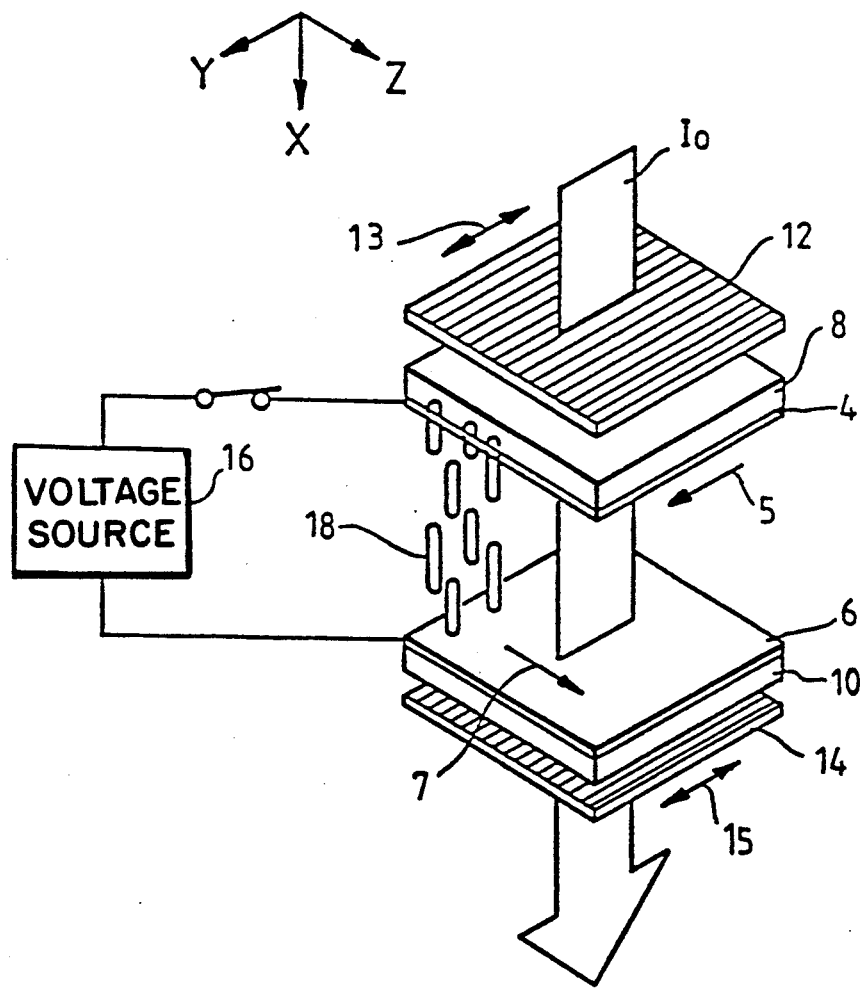
FIG. 2 is an exploded perspective view of a "normally black" type twisted nematic liquid crystal display device to which an excitation voltage has been applied.

When a voltage is applied between the electrodes 4 and 6 from the voltage source 16, as shown in FIG. 2, the major axes 18 of the molecules of the liquid crystal are changed to an orientation in parallel with an electric field formed between the electrode 4 and 6 by the applied voltage. Under these conditions, the light beam $I_0$ reaches the linearly polarizing plate 14 without its plane of polarization being rotated and the plane of polarization of the light beam $I_o$ coincides with that of the linearly polarizing plate 14. Under these conditions, the light $I_o$ can pass through the linearly polarizing plate 14, and a "bright state" is displayed for the observer below the linearly polarizing plate 14.

Liquid crystal display devices having a thickness (d) of the liquid crystal layer 3 (hereinafter this thickness (d) will be referred to as the thickness of the cell) between the electrodes 4 and 6 of 8.3, 9.2, 9.8, 10.3, 11.3, 12.4, 13.0, 13.4 and 15.1 $\mu$m, respectively, have been manufactured using a Twisted Nematic (TN) liquid crystal (ZLI3449-100 manufactured by Merk & Co.)

having a double refraction index (Δn) of 0.1325. The characteristics of these devices have been compared. If the thickness (d) of the cell is brought into such a range, the range of Δnd of the liquid crystal layer 3 becomes from 1.09 to 2.00 μm.

Figure 3:
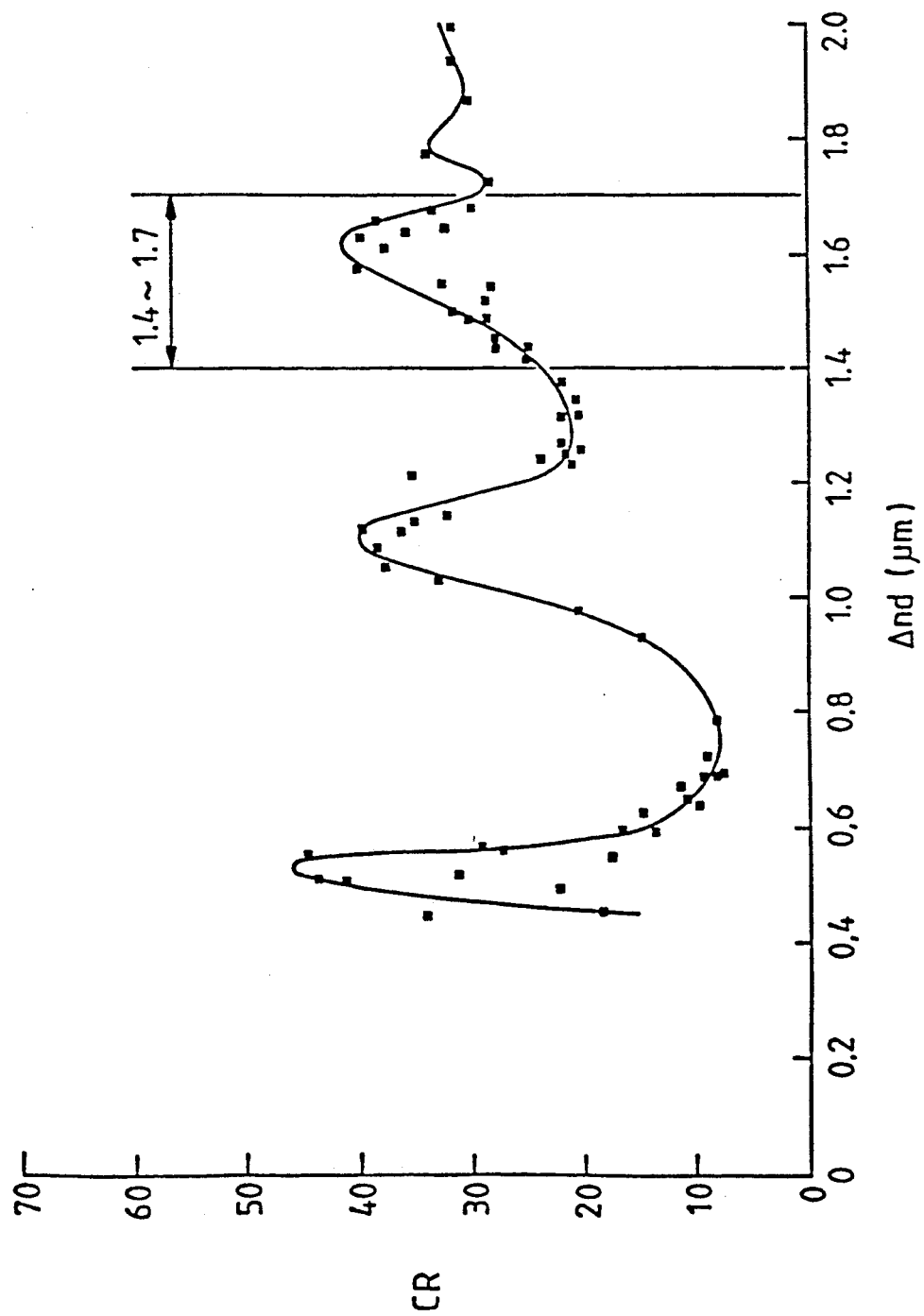
FIG. 3 is a graph showing the variation of the contrast ratio when the optical path difference in a liquid crystal display device as illustrated in FIGS. 1 and 2 is varied.

The surfaces of the electrodes 4 and 6 which are contiguous with the liquid crystal layer 3 were subjected to rubbing along the Y direction (direction 5) and the Z direction (direction 7), respectively. For a back light for the transmissiontype liquid crystal display device 2, a three wavelength type fluorescent lamp, which has peaks near the wavelengths of 435, 545, and 610 nm, and a color temperature of about 6000° K. was used. A polarizing material having a neutral gray color, with a transmission factor of about 40% and a polarization degree of not smaller than 99%, was employed for both polarizing plates 12 and 14. The chromaticity (black level color) of the display screen with no voltage applied and the transmission factor vs voltage characteristics with the voltage (rectangular wave of 30 Hz, 5 V) applied, were measured to obtain a contrast ratio. FIG. 3 shows the relationship between the optical path difference (Δnd) and the contrast ratio (CR). In FIG. 3, the regions where Δnd is from 0.5 to 0.55 μm (primary cell), from 1.1 to 1.2 μm (secondary cell) and from 1.6 to 1.7 μm (tertiary cell), are values of Δnd which give maximum values to the contrast ratio. The conventional liquid crystal display device has values of Δnd corresponding to the primary cell and the secondary cell.

The arrangement according to the present invention attempts to obtain the range of Δnd which provides an excellent dependence of chromaticity with variations in the visual angle and the stability of the thickness of the cell against a small variations, rather than the maximizing the contrast ratio.

EXAMPLE OF EXPERIMENT 1

In a liquid crystal display device having a 8.3 μm thick cell (in this case, the value of Δnd is 1.09 μm), the visual angle θ was varied. The resulting variations of the contrast ratio and the chromaticity were measured and the results are listed in Table 1.

TABLE 1

| Left (L) 40 degrees | Left (L) 30 degrees | Left (L) 20 degrees | Left (L) 10 degrees | 0 degrees | Right (R) 10 degrees | Right (R) 20 degrees | Right (R) 30 degrees | Right (R) 40 degrees | |
|---|---|---|---|---|---|---|---|---|---|
| 13.5 | 28.9 | 41.0 | 42.2 | 37.5 | 42.0 | 42.1 | 31.3 | 18.5 | Contrast ratio |
| .260, .412 | .233, .418 | .244, .363 | .273, .310 | .277, .305 | .272, .313 | .244, .372 | .230, .444 | .261, .441 | Chromaticity: x, y |
| Downward (D) 40 degrees | Downward (D) 30 degrees | Downward (D) 20 degrees | Downward (D) 10 degrees | 0 degrees | Upward (U) 10 degrees | Upward (U) 20 degrees | Upward (U) 30 degrees | Upward (U) 40 degrees | |
| 8.1 | 17.8 | 28.9 | 39.1 | 35.6 | 30.9 | 21.0 | 7.2 | 2.2 | Contrast ratio |
| .374, .283 | .355, .249 | .329, .247 | .297, .263 | .276, .299 | .284, .281 | .305, .248 | .334, .227 | .352, .234 | Chromaticity: x, y |

Figure 5A:
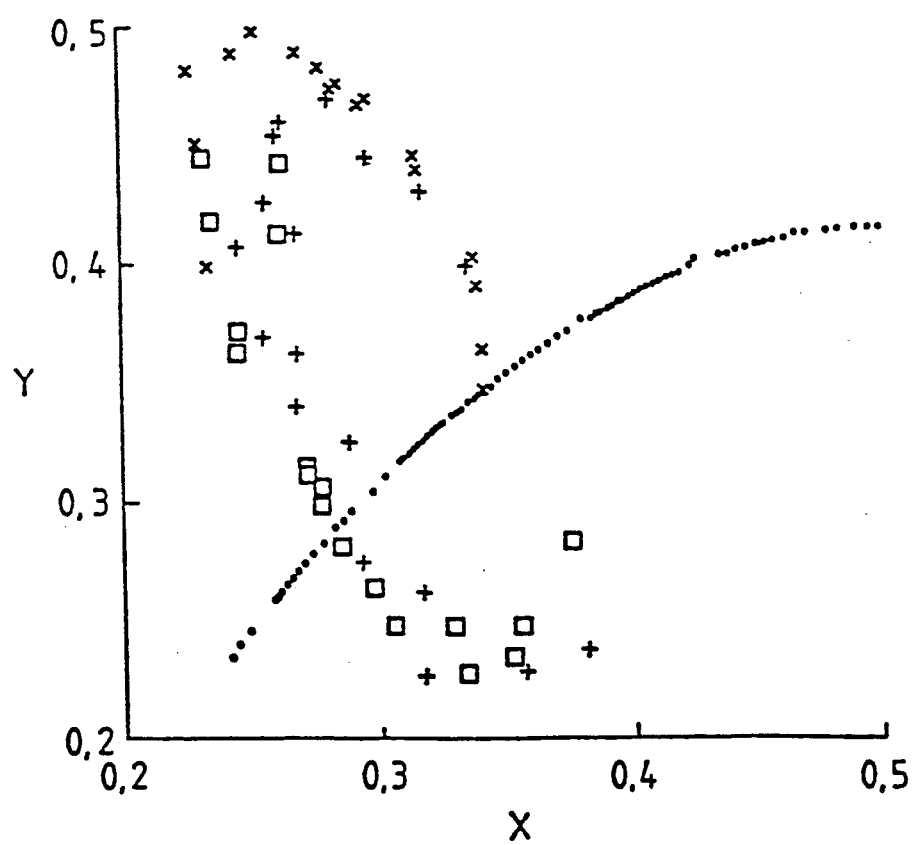
FIG. 5A is a diagram of chromaticity showing the chromaticity of the black level with the visual angle $\theta$ set to 0°, 10°, 20°, 30°, and 40° right and left, and up and down, when the optical path difference is 1.09 $\mu$m, 1.22 $\mu$m and 1.29 $\mu$m in a liquid crystal display device as illustrated in FIGS. 1 and 2.
Figure 6A:
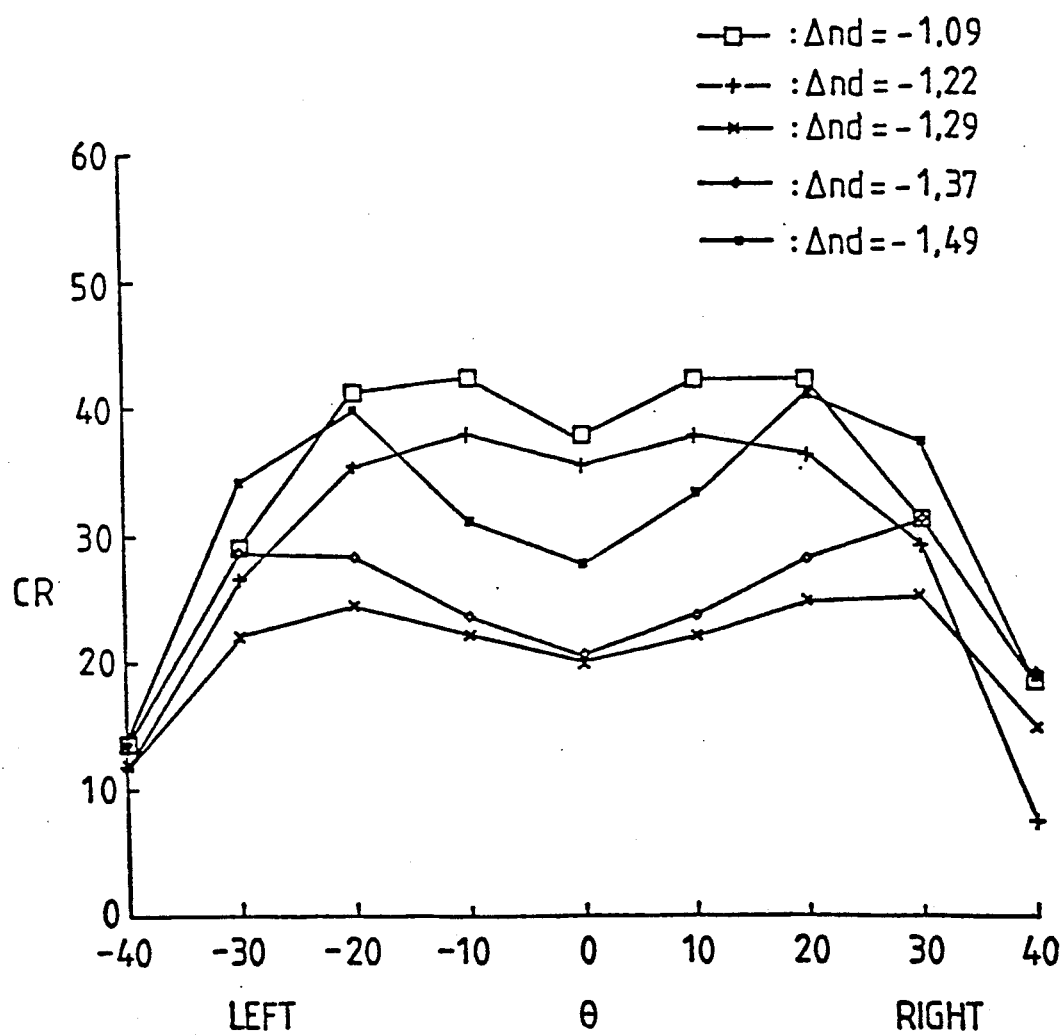
FIG. 6A is a diagram showing the contrast ratio with the visual angle $\theta$ set to 0°, 10°, 20°, 30°, and 40° right and left, when the optical path difference is 1.09 $\mu$m, 1.22 $\mu$m, 1.29 $\mu$m, 1.37 $\mu$m and 1.49 $\mu$m in a liquid crystal display device as illustrated in FIGS. 1 and 2.
Figure 6B:
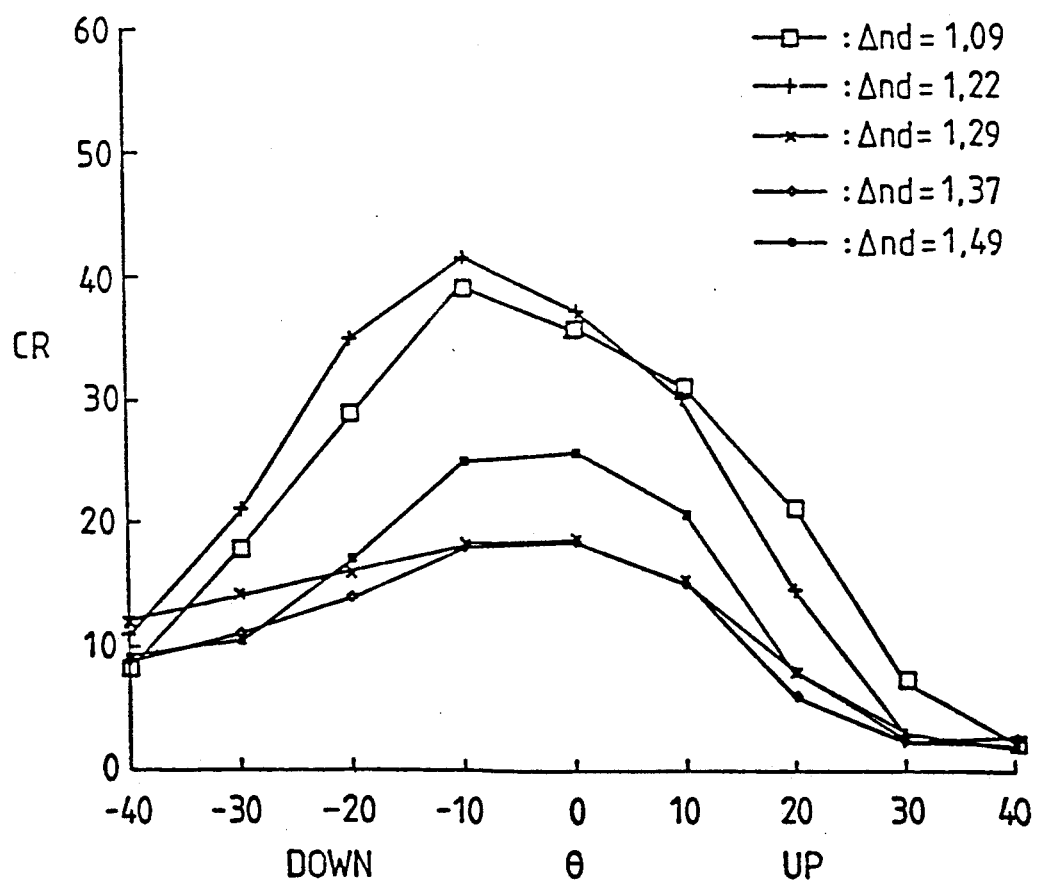
FIG. 6B is a diagram showing the contrast ratio with the visual angle $\theta$ set to 0°, 10°, 20°, 30°, and 40° up and down when the optical path difference is 1.09 $\mu$m, 1.22 $\mu$m, 1.29 $\mu$m, 1.37 $\mu$m and 1.49 $\mu$m in a liquid crystal display device as illustrated in FIGS. 1 and 2.

The contrast ratio can be made large in the area where the contrast ratio of the primary cell is maximum (refer to FIG. 3, FIG. 6A, and FIG. 6B). As evident from FIG. 5A, however, the dependence of a black level color on a visual angle was large, and the color varied depending upon the visual angle (from green to reddish violet, or vice versa).

EXAMPLE OF EXPERIMENT 2

In a liquid crystal display device having a 9.2 μm thick cell (the value of Δnd is 1.22 μm), the visual angle θ was varied. The resulting variations of the contrast ratio and the chromaticity were measured and the results are listed in Table 2.

TABLE 2

| Left (L) 40 degrees | Left (L) 30 degrees | Left (L) 20 degrees | Left (L) 10 degrees | 0 degrees | Right (R) 10 degrees | Right (R) 20 degrees | Right (R) 30 degrees | Right (R) 40 degrees | |
|---|---|---|---|---|---|---|---|---|---|
| 11.8 | 26.2 | 35.2 | 37.7 | 35.2 | 37.6 | 36.2 | 29.1 | 7.6 | Contrast ratio |
| .380, .382 | .362, .372 | .352, .367 | .351, .369 | .349, .367 | .351, .364 | .350, .357 | .357, .356 | .368, .368 | Chromaticity: x, y |
| Downward (D) 40 degrees | Downward (D) 30 degrees | Downward (D) 20 degrees | Downward (D) 10 degrees | 0 degrees | Upward (U) 10 degrees | Upward (U) 20 degrees | Upward (U) 30 degrees | Upward (U) 40 degrees | |
| 2.3 | 3.1 | 14.5 | 30.0 | 37.2 | 41.6 | 35.0 | 20.9 | 10.8 | Contrast ratio |
| .273, .393 | .420, .41 | .404, .398 | .365, .368 | .350, .357 | .349, .358 | .353, .364 | .357, .371 | .359, .375 | Chromaticity: x, y |

In this case, as in the 8.3 μm thick cell (see Experiment 1 above), the contrast ratio was large (refer to FIG. 3, FIG. 6A and FIG. 6B). However, the chromaticity in the normal direction deviated from the locus of black body (region of achromatic color), as represented by a series of dots in FIG. 4, and coloring was increased (refer to FIG. 4). It is apparent from FIG. 5A that the dependence of black level color on a visual angle was bad, and variations in color (from green to reddish violet, or vice versa) existed.

EXAMPLE OF EXPERIMENT 3

In a liquid crystal display device having a 9.8 μm thick cell (Δnd = 1.29 μm), the visual angle θ was varied. The resulting variations of the contrast ratio and the chromaticity were measured and are listed in Table 3.

EXAMPLE OF EXPERIMENT 4

In a liquid crystal display device having a 10.3 μm thick cell (Δnd = 1.37 μm), the visual angle θ is varied. The resulting variations of the contrast ratio and the chromaticity were measured and are as listed in Table 4.

TABLE 4

| Left (L) 40 degrees | Left (L) 30 degrees | Left (L) 20 degrees | Left (L) 10 degrees | 0 degrees | Right (R) 10 degrees | Right (R) 20 degrees | Right (R) 30 degrees | Right (R) 40 degrees | |
|---|---|---|---|---|---|---|---|---|---|
| 13.7 | 28.4 | 28.1 | 23.5 | 20.4 | 23.6 | 28.1 | 30.8 | 19.1 | Contrast ratio |
| .345, .325 | .358, .353 | .352, .395 | .335, .420 | .324, .429 | .338, .420 | .354, .397 | .354, .366 | .335, .346 | Chromaticity: x, y |
| Downward (D) 40 degrees | Downward (D) 30 degrees | Downward (D) 20 degrees | Downward (D) 10 degrees | 0 degrees | Upward (U) 10 degrees | Upward (U) 20 degrees | Upward (U) 30 degrees | Upward (U) 40 degrees | |
| 8.7 | 11.0 | 14.0 | 18.1 | 18.5 | 15.1 | 5.9 | 2.3 | 1.9 | Contrast ratio |
| .234, .485 | .256, .494 | .292, .463 | .316, .437 | .319, .428 | .325, .424 | .308, .441 | .285, .461 | .262, .472 | Chromaticity: x, y |

Figure 4:
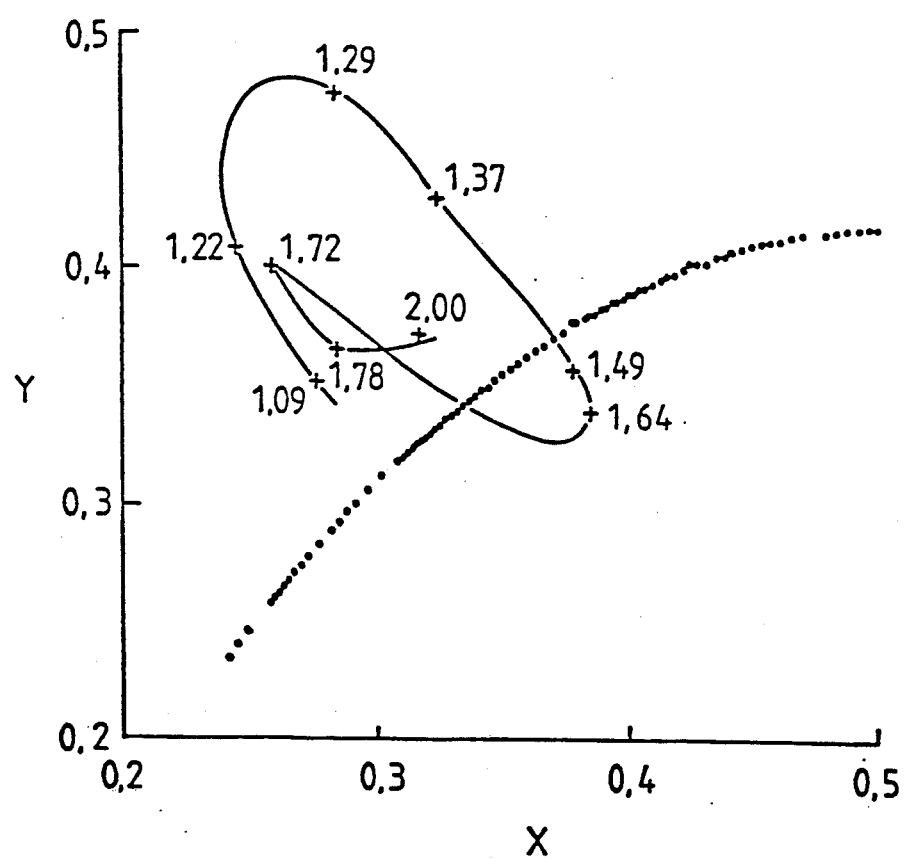
FIG. 4 is a diagram of the chromaticity showing the variation in the black level with the normal direction set to 0° when the optical path difference in a liquid crystal display device as illustrated in FIGS. 1 and 2 is varied.

The variation in chromaticity of the black level was further improved (refer to FIG. 5B) and the chromaticity in the normal direction approached achromatic color (refer to FIG. 4). In this case, the absolute value of the contrast ratio was still small (refer to FIG. 3, FIG. 6A, and FIG. 6B). But, as Δnd increases toward Δnd ≧ 1.4, there was a tendency for the contrast ratio to become large (refer to FIG. 3, FIG. 6A, and FIG. 6B). Thus, as Δnd increased from approximately 1.37 toward

TABLE 3

| Left (L) 40 degrees | Left (L) 30 degrees | Left (L) 20 degrees | Left (L) 10 degrees | 0 degrees | Right (R) 10 degrees | Right (R) 20 degrees | Right (R) 30 degrees | Right (R) 40 degrees | |
|---|---|---|---|---|---|---|---|---|---|
| 12.1 | 22.0 | 24.3 | 21.9 | 19.9 | 22.0 | 24.7 | 25.1 | 14.6 | Contrast ratio |
| .341, .346 | .339, .389 | .316, .440 | .294, .467 | .283, .475 | .295, .469 | .314, .445 | .337, .401 | .341, .364 | Chromaticity: x, y |
| Downward (D) 40 degrees | Downward (D) 30 degrees | Downward (D) 20 degrees | Downward (D) 10 degrees | 0 degrees | Upward (U) 10 degrees | Upward (U) 20 degrees | Upward (U) 30 degrees | Upward (U) 40 degrees | |
| 11.9 | 14.3 | 16.2 | 18.4 | 18.2 | 15.1 | 8.6 | 2.5 | 2.7 | Contrast ratio |
| .233, .398 | .224, .480 | .252, .499 | .278, .483 | .283, .473 | .285, .475 | .268, .488 | .243, .488 | .228, .450 | Chromaticity: x, y |

The variation in chromaticity of the black level was improved compared with the examples of Experiments 1 and 2 (refer to FIG. 5A). But, the absolute value of the contrast ratio was as small as half or so of the contrast ratio where Δnd = 1.09 μm (refer to FIG. 3, FIG. 6A, and FIG. 6B).

approximately 1.4, the visual angle characteristic became superior.

EXAMPLE OF EXPERIMENT 5

In a liquid crystal display device having a 11.3 μm thick cell (Δnd = 1.49 μm), the visual angle θ was varied. The resulting variations of the contrast ratio and the chromaticity were measured and are listed in Table 5.

TABLE 5

| Left (L) 40 de- | Left (L) 30 de- | Left (L) 20 de- | Left (L) 10 de- | 0 de- | Right (R) 10 de- | Right (R) 20 de- | Right (R) 30 de- | Right (R) 40 de- |
|---|---|---|---|---|---|---|---|---|

TABLE 5-continued

| grees | grees | grees | grees | grees | grees | grees | grees | grees | |
|---|---|---|---|---|---|---|---|---|---|
| 14.0 | 34.0 | 39.7 | 31.0 | 27.6 | 33.0 | 40.9 | 37.3 | 17.8 | Contrast ratio |
| .317, .326 | .343, .327 | .373, .337 | .380, .346 | .377, .356 | .379 .349 | .372, .342 | .333, .345 | .303, .353 | Chromaticity: x, y |

| Downward (D) 40 degrees | Downward (D) 30 degrees | Downward (D) 20 degrees | Downward (D) 10 degrees | 0 degrees | Upward (U) 10 degrees | Upward (U) 20 degrees | Upward (U) 30 degrees | Upward (U) 40 degrees | |
|---|---|---|---|---|---|---|---|---|---|
| 9.3 | 10.5 | 17.2 | 25.0 | 25.6 | 20.6 | 7.9 | 3.2 | 1.9 | Contrast ratio |
| .298, .431 | .326, .407 | .358, .377 | .373, .359 | .374, .355 | .381, .347 | .372, .355 | .350, .369 | .327, .385 | Chromaticity: x, y |

In this case, the variation in the chromaticity of the black level approached the locus of the black body (as represented by a series of dots in FIGS. 4 and 5B) and its dependence on the visual angle was small (refer to FIG. 4 and FIG. 5B). The contrast ratio rose to about 75% of the peak value ($\Delta nd = 1.09$ μm), which is not considered to be inferior to the peak value. The background color is stabilized in a reddish violet region.

EXAMPLE OF EXPERIMENT 6

In a liquid display crystal device having a 12.4 μm thick cell ($\Delta nd = 1.64$ μm), the visual angle $\theta$ was varied. The resulting variations of the contrast ratio and the chromaticity are listed in Table 6.

TABLE 6

| Left (L) 40 degrees | Left (L) 30 degrees | Left (L) 20 degrees | Left (L) 10 degrees | 0 degrees | Right (R) 10 degrees | Right (R) 20 degrees | Right (R) 30 degrees | Right (R) 40 degrees | |
|---|---|---|---|---|---|---|---|---|---|
| 17.7 | 36.0 | 41.2 | 35.5 | 31.6 | 35.2 | 37.0 | 26.6 | 10.7 | Contrast ratio |
| .279, .364 | .311, .355 | .372, .337 | .404, .329 | .392, .328 | .404, .329 | .372, .337 | .311 .355 | .279, .364 | Chromaticity: x, y |

| Downward (D) 40 degrees | Downward (D) 30 degrees | Downward (D) 20 degrees | Downward (D) 10 degrees | 0 degrees | Upward (U) 10 degrees | Upward (U) 20 degrees | Upward (U) 30 degrees | Upward (U) 40 degrees | |
|---|---|---|---|---|---|---|---|---|---|
| 6.4 | 11.8 | 21.9 | 32.6 | 32.1 | 21.3 | 5.2 | 0.77 | 0.83 | Contrast ratio |
| .396, .339 | .424, .327 | .430, .323 | .430, .324 | .385, .338 | .410, .329 | .425, .326 | .436, .322 | .422, .331 | Chromaticity: x, y |

Figure 6C:
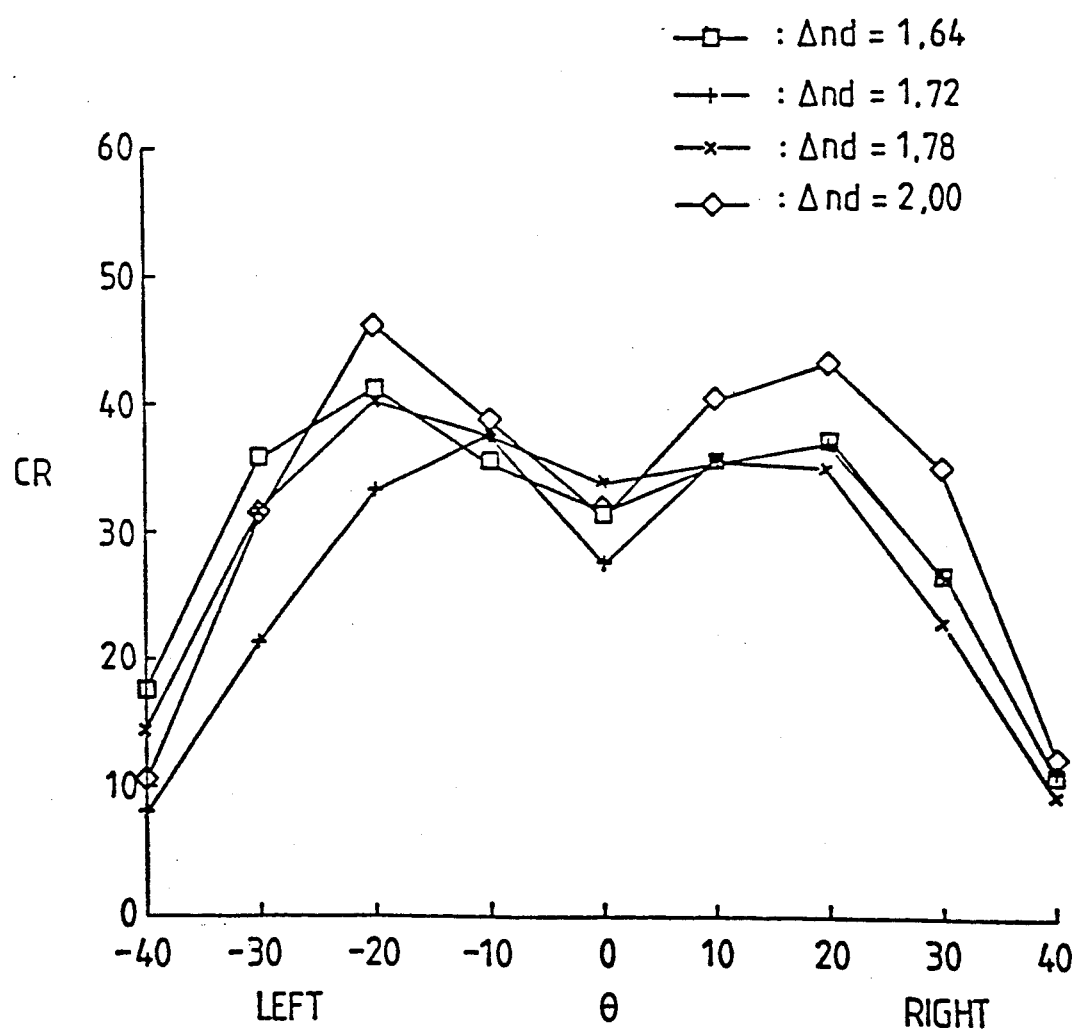
FIG. 6C is a diagram showing the contrast ratio with the visual angle $\theta$ set to 0°, 10°, 20°, 30°, and 40° right and left when the optical path difference is 1.64 $\mu$m, 1.72 $\mu$m, 1.78 $\mu$m and 2.00 $\mu$m in a liquid crystal display device illustrated in FIGS. 1 and 2.

In this case, the chromaticity of the black level (normal direction) was near the locus of a black body, and its dependence on the visual angle became inclined to sandwich the locus of the black body and to spread on both sides of it (refer to FIG. 4 and FIG. 5B). The contrast ratio in this case was further improved (refer to FIG. 3, FIG. 6C and FIG. 6D), to about 85% of the peak value ($\Delta nd = 1.09$ μm), which is not considered to be inferior to the peak value. The background color is reddish violet and comparatively stable.

EXAMPLE OF EXPERIMENT 7

In a liquid crystal display device having a 13.0 μm thick cell ($\Delta nd = 1.72$ μm), the visual angle $\theta$ was varied. The resulting variations in the contrast ratio and the chromaticity are listed in Table 7.

TABLE 7

| Left (L) 40 degrees | Left (L) 30 degrees | Left (L) 20 degrees | Left (L) 10 degrees | 0 degrees | Right (R) 10 degrees | Right (R) 20 degrees | Right (R) 30 degrees | Right (R) 40 degrees | |
|---|---|---|---|---|---|---|---|---|---|
| 8.3 | 21.5 | 33.2 | 37.5 | 27.6 | 35.5 | 36.6 | 26.6 | 11.1 | Contrast ratio |
| .269, .377 | .252, .398 | .244, .410 | .252, .405 | .258, .400 | .257, .408 | .247, .417 | .251, .412 | .273 .392 | Chromaticity: x, y |

| Downward (D) 40 degrees | Downward (D) 30 degrees | Downward (D) 20 degrees | Downward (D) 10 degrees | 0 degrees | Upward (U) 10 degrees | Upward (U) 20 degrees | Upward (U) 30 degrees | Upward (U) 40 degrees | |
|---|---|---|---|---|---|---|---|---|---|
| 13.4 | 22.7 | 33.2 | 37.2 | 29.6 | 21.7 | 8.2 | 3.56 | 3.42 | Contrast |

TABLE 7-continued

| | | | | | | | | | |
|---|---|---|---|---|---|---|---|---|---|
| .393, .315 | .368, .320 | .310, .352 | .270, .385 | .247, .409 | .261, .391 | .280, .367 | .326, .328 | .373, .294 | ratio Chromaticity: x, y |

In this case, the chromaticity (normal direction) of the black level tended to move away from the vicinity of the locus of the black body (refer to FIG. 4). The absolute value of the contrast ratio was lower compared with the example of the Experiment 6 and the dependence of the chromaticity on the visual angle was lower compared with the example of the Experiment 6, and especially the visual angle on the left side narrows (refer to FIG. 6C). The background color is around green, and varies to reddish violet depending on the visual angle.

EXAMPLE OF EXPERIMENT 8

In a liquid crystal display device having a 13.4 μm thick cell (Δnd=1.78 μm), the visual angle θ was varied. The resulting variations of the contrast ratio and the chromaticity are as listed in Table 8.

TABLE 8

| Left (L) 40 degrees | Left (L) 30 degrees | Left (L) 20 degrees | Left (L) 10 degrees | 0 degrees | Right (R) 10 degrees | Right (R) 20 degrees | Right (R) 30 degrees | Right (R) 40 degrees | |
|---|---|---|---|---|---|---|---|---|---|
| 14.6 | 31.9 | 40.2 | 37.5 | 33.8 | 35.6 | 35.0 | 23.1 | 9.5 | Contrast ratio |
| .299, .383 | .276, .395 | .274, .395 | .288, .380 | .278, .371 | .288, .380 | .274, .395 | .276, .395 | .299 .383 | Chromaticity: x, y |

| Downward (D) 40 degrees | Downward (D) 30 degrees | Downward (D) 20 degrees | Downward (D) 10 degrees | 0 degrees | Upward (U) 10 degrees | Upward (U) 20 degrees | Upward (U) 30 degrees | Upward (U) 40 degrees | |
|---|---|---|---|---|---|---|---|---|---|
| 9.6 | 17.0 | 28.8 | 38.2 | 35.5 | 21.6 | 5.0 | 0.84 | 0.87 | Contrast ratio |
| .422, .297 | .388, .309 | .336, .331 | .297, .362 | .285, .365 | .285, .375 | .305, .356 | .340, .334 | .386, .313 | Chromaticity: x, y |

Figure 6D:
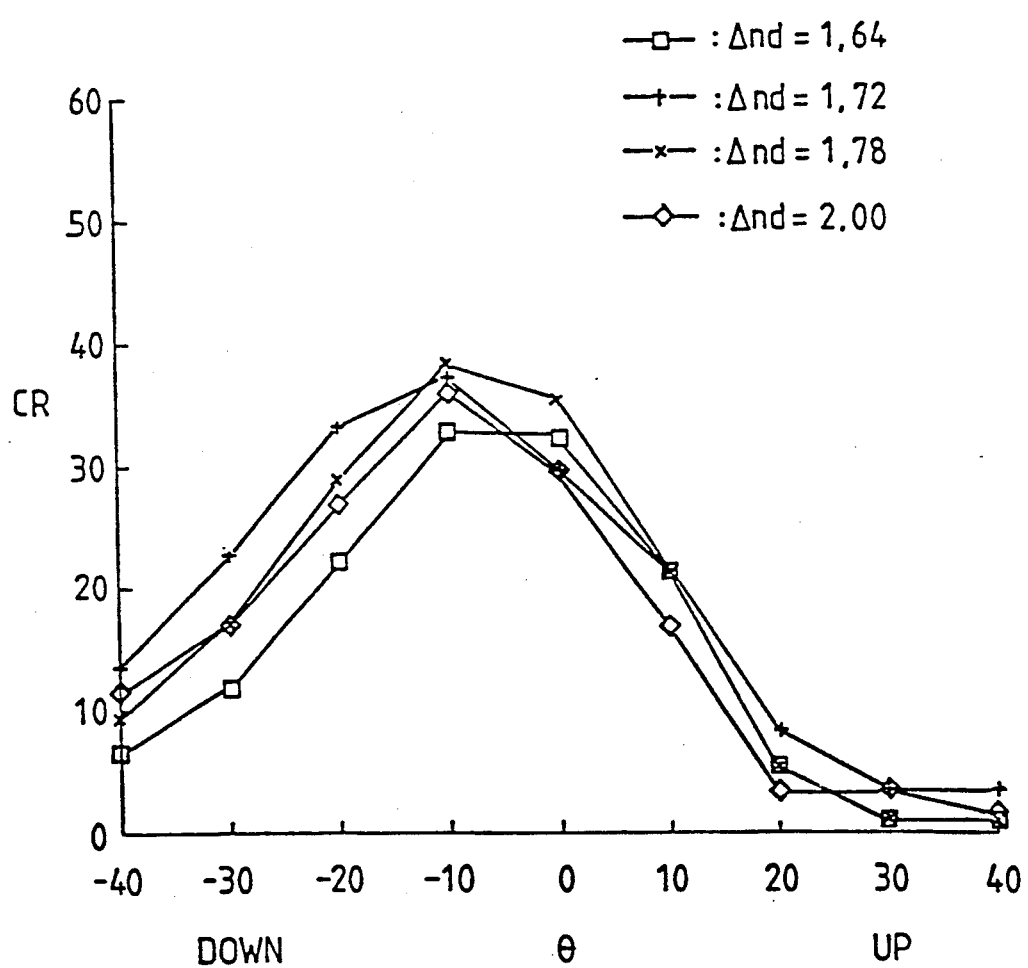
FIG. 6D is a diagram showing the contrast ratio with the visual angle $\theta$ set to 0°, 10°, 20°, 30°, and 40° up and down when the optical path difference is 1.64 $\mu$m, 1.72 $\mu$m 1.78 $\mu$m and 2.00 $\mu$m in a liquid crystal display device as illustrated in FIGS. 1 and 2.

In this case, the chromaticity of the black level (normal direction) tended to approach the locus of the black body (refer to FIG. 4), and the value of the contrast was not inferior (refer to FIG. 6D). The background color is around dark green, and it varies to reddish violet when the visual angle is large. Since the optical response speed of a liquid crystal is increased in proportion to the square of the thickness (d) of a cell (response is slow), thus it is advantageous if the cell is thin. Thus, the advantage of the present invention decreases when the chromaticity goes outside the region specified.

EXAMPLE OF EXPERIMENT 9

In a liquid crystal display device having a 15.1 μm thick cell (Δnd=2.00 μm), the visual angle θ was varied. The resulting variations of the contrast ratio and the chromaticity are listed in Table 9.

TABLE 9

| Left (L) 40 degrees | Left (L) 30 degrees | Left (L) 20 degrees | Left (L) 10 degrees | 0 degrees | Right (R) 10 degrees | Right (R) 20 degrees | Right (R) 30 degrees | Right (R) 40 degrees | |
|---|---|---|---|---|---|---|---|---|---|
| 10.7 | 31.3 | 46.1 | 38.6 | 31.5 | 40.3 | 43.1 | 34.8 | 12.3 | Contrast ratio |
| .311, .324 | .309, .338 | .322, .342 | .323, .357 | .317, .370 | .326, .357 | .319, .350 | .298, .355 | .297, .350 | Chromaticity: x, y |

| Downward (D) 40 degrees | Downward (D) 30 degrees | Downward (D) 20 degrees | Downward (D) 10 degrees | 0 degrees | Upward (U) 10 degrees | Upward (U) 20 degrees | Upward (U) 30 degrees | Upward (U) 40 degrees | |
|---|---|---|---|---|---|---|---|---|---|
| 11.3 | 16.7 | 26.8 | 35.8 | 29.1 | 16.1 | 3.2 | 3.09 | 1.50 | Contrast ratio |
| .243, .413 | .254, .437 | .289, .411 | .310, .379 | .312, .376 | .321, .368 | .309, .388 | .283, .415 | .256 .424 | Chromaticity: x, y |

Figure 5C:
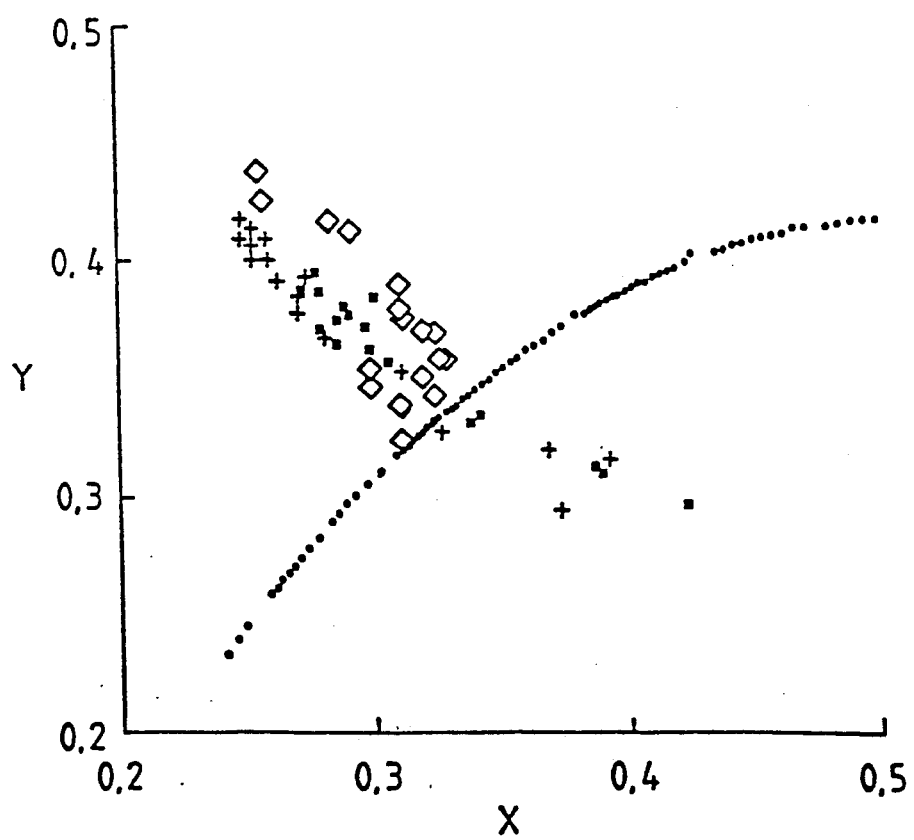
FIG. 5C is a diagram of chromaticity showing the chromaticity of the black level with the visual angle $\theta$ set to 0°, 10°, 20°, 30°, and 40° right and left, and up and down, when the optical path difference is 1.72 $\mu$m, 1.78 $\mu$m, and 2.00 $\mu$m in a liquid crystal display device as illustrated in FIGS. 1 and 2.

In this case, the chromaticity of the black level tended to approach the locus of the black body closer than in the example of the Experiment 8 (refer to FIG. 4), and the dependence thereof on the visual angle was small (FIG. 5C). However, the dependence of the contrast ratio on the visual angle was large. The value of the contrast ratio when the visual angle increased in the upward direction was apparently lower (refer to FIG. 3, FIG. 6C, and FIG. 6D). Also, because the thickness of the cell (d) is large, there is no advantage from the viewpoint of the response speed.

In the example of the Experiment 4 (Δnd=1.37 μm), the chromaticity in the normal direction approached achromatic color, further, the contrast ratio tended to increase with increase of Δnd. The contrast ratio was also found to be low for Δnd=approximately 1.4 μm or less. Finally, the variation in the chromaticity (dependence of the chromaticity on the visual angle) was large for Δnd=approximately 1.1 μm while the contrast ratio shows a peak value. Accordingly, the value Δnd=approximately 1.4 μm is considered to be a low limit. When Δnd is not less than approximately 1.4 μm and not more than approximately 1.7 μm, the background color is stabilized at a reddish violet, the dependence of the chromaticity on the visual angle is small, and the chromaticity in the normal direction is near achromatic color. Also, since the contrast ratio is comparatively large (contrast ratio is not less than approximately 20:1), a "normally black" type liquid crystal display device that is not inferior to the peak can be obtained. Where the value of Δnd exceeds approximately 1.7 μm, the chromaticity in the normal direction moves away from the locus of the black body, and the variation in chromaticity is large in comparison with the thickness of the cell. There is a further disadvantage in that the background color varies from green to reddish violet depending on the visual angle. The contrast ratio is comparatively stable, with the increase of Δnd, and the characteristic of the visual angle as it increases in the upward direction deteriorates. In addition, a thinner cell is desirable from the viewpoint of response speed. From this viewpoint, the advantage is small if Δnd exceeds 1.7 μm.

In the above-mentioned examples, the thickness (d) of the cell is varied with the double refraction index (Δn) set to a constant of 0.1325. However, even if the double refraction index (Δn) of the liquid crystal layer is varied with the thickness (d) set to a constant, or both the thickness (d) of the cell and the double refraction index (Δn) are varied, the same effect is obtained.

Thus in a "normally black" type twisted nematic liquid crystal display device it is advantageous to have an optical path difference (Δnd) not less than approximately 1.4 μm and not more than approximately 1.7 μm, where Δnd is the product of the thickness (d) of the liquid crystal layer (thickness of the cell) and the double refraction index (Δn) of the liquid crystal layer concerned. A display display device according to the present invention has the following advantages:

The black level (background color) is stable against variation in the visual angle, and the background color in the normal direction is near achromatic color (in this range, the background color is reddish violet).

A sufficient contrast ratio can be obtained (about 20:1 or more in the normal direction), and the visual angle is comparatively wide.

The cell has a thickness (≈10 μm) which is easy to control to a certain degree, and the contrast and the chromaticity are stable against a very small variation in the thickness of the cell (this is especially advantageous in a large screen display device).

As to the response speed, a sufficiently satisfactory speed as a display can be achieved if the Δn of the liquid crystal material is made large and the thickness of the cell (d) is made small.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What I claim is:

1. A twisted nematic liquid crystal display device comprising:
    a first transparent substrate;
    a first transparent electrode which has been subjected to orientation treatment in a first direction disposed on said first substrate;
    a second transparent substrate spaced apart and parallel to said first substrate;
    a second transparent electrode which has been subjected to orientation treatment in a second direction disposed on said second substrate;
    a liquid crystal layer wherein major axes of the molecules have been subjected to a twisted orientation of 90°, located between said first and second electrodes;
    a first transparent polarizing plate having a direction of polarization coinciding with said first direction and located outside said first electrode, and
    a second transparent polarizing plate having a direction of polarization coinciding with said second direction and located outside said second electrode,
    wherein when no voltage is applied between said two electrodes; light incident on said first polarizing plate is not able to pass through the liquid crystal layer due to the twisted orientation through 90° of the major axes of the molecules of said liquid crystal layer,
    when an excitation voltage is applied between said two electrodes; the major axes of the molecules of said liquid crystal layer are re-oriented so as to lie parallel to the electric field and light incident on said first polarizing plate is able to pass through the liquid crystal layer and out through the second polarizing plate, and
    a difference in optical path length of said liquid crystal layer, which is equal to a product of thickness of the liquid crystal layer and double refraction index of the liquid crystal layer, has a value such that 1.4 μm ≦ Δnd ≦ 1.7 μm, for light from a three wavelength source.

2. The twisted nematic liquid crystal display device of claim 1, wherein said light has peaks at wavelengths of approximately 435, 545 and 610 nanometers.

3. The twisted nematic liquid crystal display device of claim 1, wherein the light has a color temperature of approximately 6000° K.

4. A liquid crystal cell comprising:
    a pair of transparent substrates disposed parallel to one another and separated by a distance;
    a polarizing plate associated with and parallel to each substrate;
    a layer of liquid crystal material having a double refractive index and a thickness disposed between said substrates, wherein a product of said thickness, in μm, and said double refractive index, is greater than approximately 1.4 μm and less than approximately 1.7 μm, for light from a three wavelength source; and an electrode in contact with said liquid crystal material disposed on each of said substrates.

5. The liquid crystal cell of claim 4, wherein said light has peaks at wavelengths of approximately 435, 545 and 610 nanometers.

6. The liquid crystal cell of claim 4, wherein the light has a color temperature of approximately 6000° K.

* * * * *